US012297790B2

(12) United States Patent
Hirao et al.

(10) Patent No.: US 12,297,790 B2
(45) Date of Patent: May 13, 2025

(54) ENGINE AND FLYWHEEL HOUSING

(71) Applicant: Yanmar Holdings Co., Ltd., Osaka (JP)

(72) Inventors: Yu Hirao, Osaka (JP); Shinya Matsuo, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/119,173

(22) Filed: Mar. 8, 2023

(65) Prior Publication Data

US 2023/0287846 A1 Sep. 14, 2023

(30) Foreign Application Priority Data

Mar. 10, 2022 (JP) ................................ 2022-036986

(51) Int. Cl.

| | |
|---|---|
| ***F02M 13/04*** | (2006.01) |
| ***F01M 13/04*** | (2006.01) |
| ***F02B 75/22*** | (2006.01) |
| ***F02F 7/00*** | (2006.01) |
| ***F02N 5/04*** | (2006.01) |
| *F01M 13/00* | (2006.01) |

(52) U.S. Cl.

CPC ........... *F02F 7/0012* (2013.01); *F01M 13/04* (2013.01); *F02B 75/22* (2013.01); *F02N 5/04* (2013.01); *F01M 2013/005* (2013.01)

(58) Field of Classification Search

CPC .... F01M 13/04; F01M 13/0405; F01M 13/00; F01M 13/0033; F16M 1/02

See application file for complete search history.

(56) References Cited

U.S. PATENT DOCUMENTS 1,484,935 A * 2/1924 Dunann .................. F16N 29/00 116/276
1,777,319 A * 10/1930 MacPherson ........ F01M 13/028 123/41.86
4,723,529 A * 2/1988 Yokoi ................ F01M 13/0416 123/573
4,922,881 A * 5/1990 Tamba .................. F01M 13/04 123/90.34

(Continued)

FOREIGN PATENT DOCUMENTS

CN 112761754 A * 5/2021 ............. F01M 13/00
DE 1142467 B * 1/1963

(Continued)

OTHER PUBLICATIONS

JP 5159550 B2—translation (Year: 2013).*
European Search Report issued dated Aug. 1, 2023 issued in EP23159655.2.

*Primary Examiner* — George C Jin
*Assistant Examiner* — Teuta B Holbrook
(74) *Attorney, Agent, or Firm* — NORTON ROSE FULBRIGHT US LLP

(57) ABSTRACT

An engine includes: a cylinder block that has a cylinder included in a combustion chamber; a crankshaft that is placed in the cylinder block; a flywheel that is mounted to one end portion of the crankshaft; and a flywheel housing that is placed on a side of one end face of the cylinder block in a direction of the crankshaft and that houses the flywheel. The flywheel housing has a blow-by gas path through which a blow-by gas passes.

18 Claims, 9 Drawing Sheets

(56) References Cited

U.S. PATENT DOCUMENTS

| | | | | |
|---|---|---|---|---|
| 5,617,834 | A | 4/1997 | Lohr | |
| 2001/0024915 | A1* | 9/2001 | Mashiko | B63H 21/32 440/89 C |
| 2005/0205072 | A1* | 9/2005 | Sharman | F01M 13/04 123/573 |
| 2006/0107914 | A1* | 5/2006 | Dingle | F01L 9/11 123/90.12 |
| 2009/0090316 | A1* | 4/2009 | Yamazawa | F02F 1/24 123/54.4 |
| 2010/0059014 | A1* | 3/2010 | Sicre | F02F 7/0053 123/195 H |
| 2018/0306075 | A1 | 10/2018 | Osada et al. | |
| 2021/0381410 | A1 | 12/2021 | Igarashi | |

FOREIGN PATENT DOCUMENTS

| | | | | | |
|---|---|---|---|---|---|
| JP | 2005-140104 | A | | 6/2005 | |
| JP | 5159550 | B2 | * | 3/2013 | |
| JP | 2017115742 | A | * | 6/2017 | B63H 20/001 |
| KR | 20150078882 | A | * | 7/2005 | |
| RU | 16385 | U1 | * | 12/2000 | |
| TW | 200409857 | A | * | 6/2004 | F01M 13/04 |
| WO | 03102388 | A1 | | 12/2003 | |
| WO | WO-03104621 | A1 | * | 12/2003 | F01M 13/04 |
| WO | WO-2020067080 | A1 | * | 4/2020 | |

* cited by examiner

ENGINE AND FLYWHEEL HOUSING

CROSS-REFERENCE TO RELATED APPLICATIONS

This application claims priority under 35 U.S.C. § 119 to JP Application No. 2022-036986 filed Mar. 10, 2022, the entire contents of which are hereby incorporated by reference.

TECHNICAL FIELD

The present invention relates to an engine and a flywheel housing.

BACKGROUND ART

Conventionally, there is a known technology that, out of a crankcase (cylinder block), efficiently discharges a blow-by gas which flows from a combustion chamber into an inner space of the crankcase (see, for example, Patent Document 1). The crankcase of the Patent Document 1 includes a blow-by gas path that is formed inside the crankcase, and that discharges the blow-by gas inside the crankcase to the upper portion of the crankcase.

PRIOR ART DOCUMENT

Patent Document

Patent Document 1: Japanese Unexamined Patent Application Publication No. 2005-140104

SUMMARY OF INVENTION

Technical Problem

In the configuration of the Patent Document 1, an outlet of the blow-by gas path is provided on the upper face of the crankcase. Usually, there is very little free space on the crankcase's upper face, where a cylinder head, an intake manifold, etc. are placed. Due to this, it is not easy to place a gas pipe for leading, to another place, the blow-by gas output from the blow-by gas path. Trying to place the gas pipe connected to the blow-by gas's outlet provided on the upper face of the crankcase needs to take an action such as increasing the overall length of the crankcase so as to avoid contact with the cylinder head and the like. There is a concern that increasing the overall length of the crankcase enlarges the engine.

It is an object of the present invention to provide, while avoiding enlarging of an engine, a technology that can properly discharge a blow-by gas out of a cylinder block.

Solution to Problem

An engine exemplary of the present invention includes: a cylinder block that has a cylinder included in a combustion chamber; a crankshaft that is placed in the cylinder block; a flywheel that is mounted to one end portion of the crankshaft; and a flywheel housing that is placed on a side of one end face of the cylinder block in a direction of the crankshaft and that houses the flywheel. The flywheel housing has a blow-by gas path through which a blow-by gas passes.

Advantageous Effects of Invention

The exemplary present invention can provide, while avoiding enlarging of an engine, a technology that can properly discharge a blow-by gas out of a cylinder block.

DESCRIPTION OF EMBODIMENTS

Figure 1:
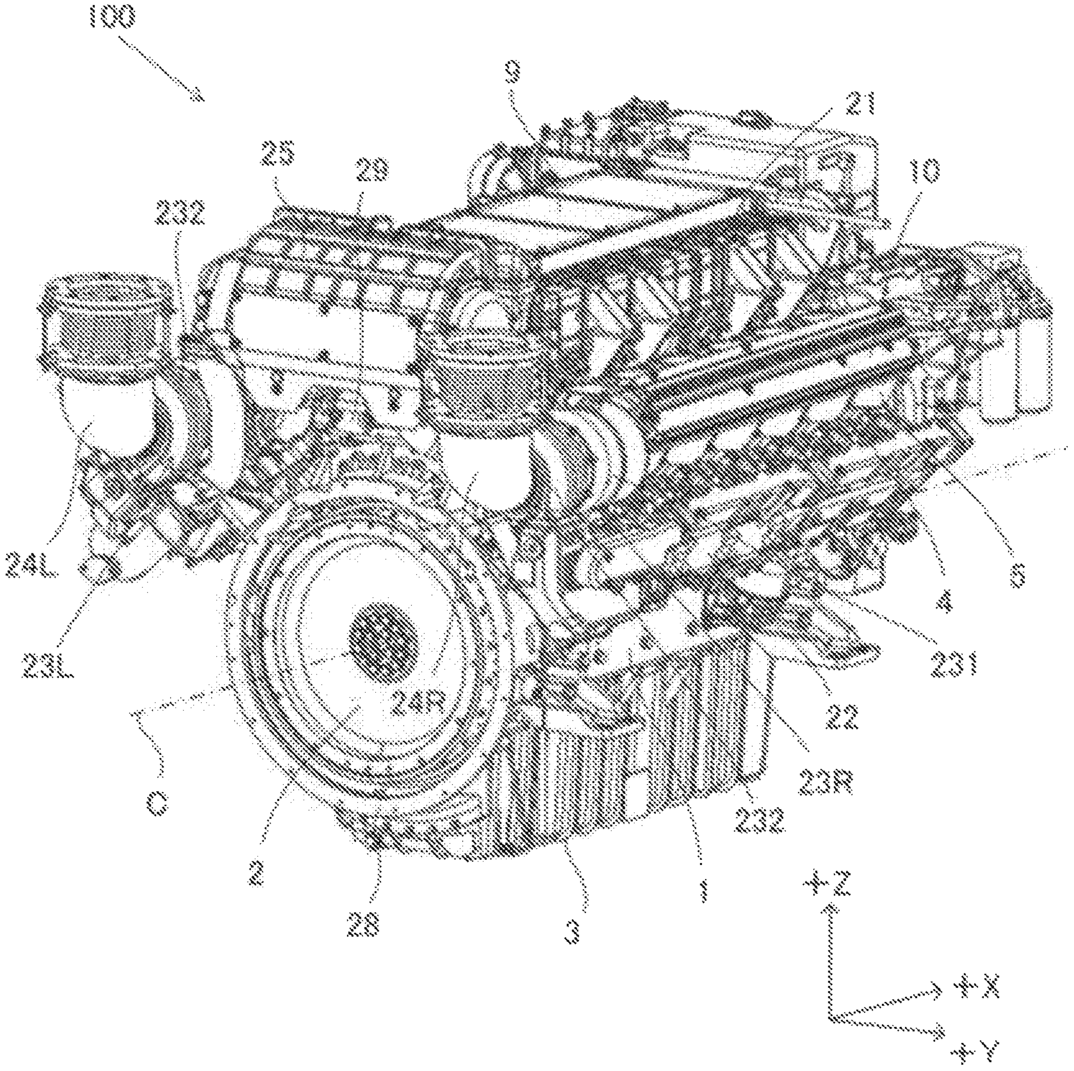
FIG. 1 is a schematic perspective view showing a configuration of an engine.

The following is a detailed description of an exemplary embodiment of the present invention with reference to the drawings. In the drawings, XYZ coordinate system is shown as the 3D Cartesian coordinate system, as appropriate. In the following description, X direction is defined as a front and back direction, Y direction is defined as a right and left direction, and Z direction is defined as an up and down direction. +X side is defined as a front side, and −X side is defined as a back side. +Y side is defined as a right side, and −Y side is defined as the left side. +Z side is defined as an upper side, and −Z side is defined as a lower side. In detail, the direction in which a center line C of a crankshaft (output shaft) shown in FIG. 1 extends is defined as the front and back direction, and the side where a flywheel 2 is placed relative to a cylinder block 1 is defined as the back side. The up and down direction is defined with the side, where an oil pan 3 is placed relative to the cylinder block 1, as the lower side. The direction orthogonal to the front and back and up and down directions is defined as the right and left direction, with the right side being the right side and the left side being the left side when viewed from the back toward the front. These directions are names merely used for an illustrative purpose, and are not intended to limit the actual positional relation and direction. In the present specification, the crankshaft direction is the same as the front and back direction in which the center line C of the crankshaft extends.

<1. Overview of Engine>

FIG. 1 is a schematic perspective view showing a configuration of an engine 100 according to an embodiment of the present invention. The engine 100 is preferable, for example, as a marine engine used for a ship. However, the engine 100 is not limited to the marine engine, and may be applied to any other application. The engine 100 is a diesel engine.

Figure 2:
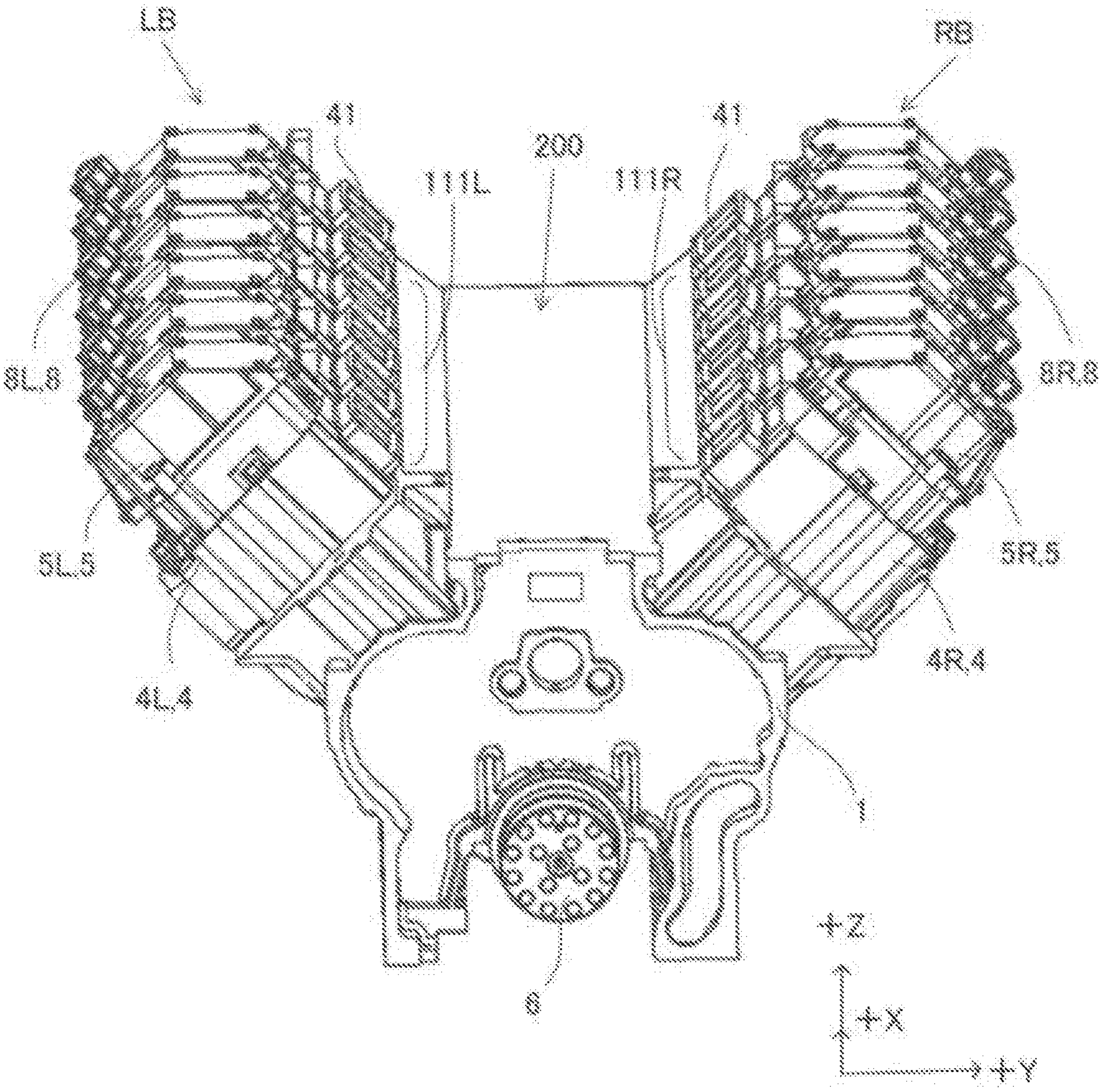
FIG. 2 is a schematic perspective view extracting and showing a portion including a cylinder block, a head block, and a head cover which are provided in the engine.
Figure 3:
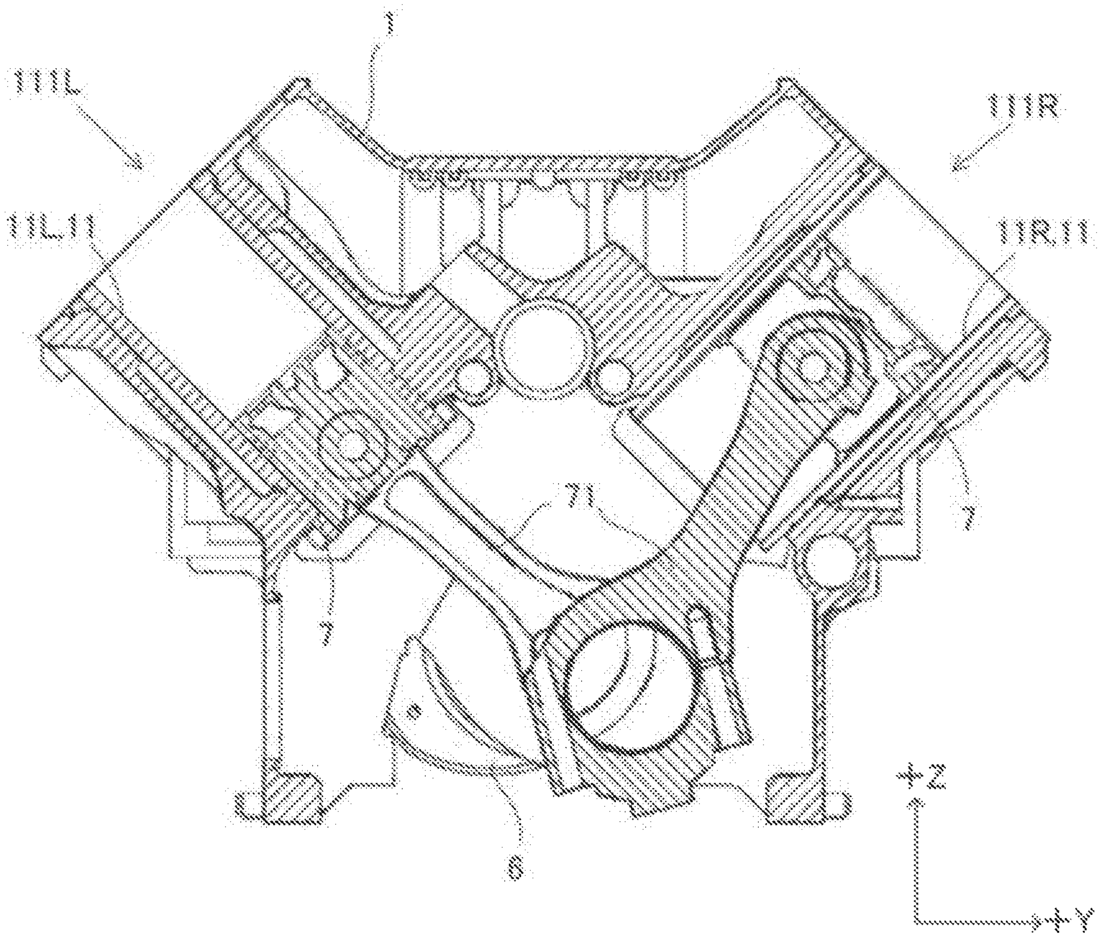
FIG. 3 is a schematic cross-sectional view of a cylinder block portion provided in the engine.

As shown in FIG. 1, the engine 100 includes a cylinder block 1, a head block 4, and a head cover 5. FIG. 2 is a schematic perspective view extracting and showing a portion including the cylinder block 1, the head block 4, and the head cover 5 which are provided in the engine 100. FIG. 3 shows a schematic cross-sectional view of the cylinder block 1 portion of the engine 100.

As shown in FIGS. 2 and 3, a crankshaft 6 and a piston 7 which extend in the front and back direction are placed inside the cylinder block 1. That is, the engine 100 has the crankshaft 6 that is placed in the cylinder block 1. The interior of the cylinder block 1 connects to the interior of the oil pan 3 which is placed at the lower side and stores a lubricant oil. A flywheel 2 (see FIG. 1) is mounted to the back end of the crankshaft 6. That is, the engine 100 is provided with the flywheel 2 mounted to one end portion of the crankshaft 6. In detail, the flywheel 2 is mounted on the one end portion of the crankshaft 6 protruding from the cylinder block 1. The flywheel 2 rotates integrally with the crankshaft 6, and is used to take out power from the engine 100. The piston 7, in detail, is placed in the cylinder 11 formed in the cylinder block 1. The piston 7 is connected to the crankshaft 6 via a connecting rod 71.

The cylinder block 1 has the cylinder 11 included in the combustion chamber. In detail, the cylinder block 1 has a right cylinder 11R placed on the right side and a left cylinder 11L placed on the left side. The right cylinder 11R, when viewed from behind, is of a cylindrical shape which is tilted to the right relative to the up and down direction and extends in an oblique direction. The left cylinder 11L, when viewed from behind, is of a cylindrical shape which is tilted to the left relative to the up and down direction and extends in an oblique direction. The right cylinder 11R and the left cylinder 11L are placed in a V-shape. The pairwise right cylinder 11R and left cylinder 11L which are placed in the V-shape are placed with their cylinder axes slightly offset in the front and back direction. In the present embodiment, the left cylinder 11L is placed slightly forward of the right cylinder 11R.

The cylinder block 1 has a right cylinder row 111R with the plural right cylinders 11R arranged in the front and back direction, and a left cylinder row 111L with the plural left cylinders 11L arranged in the front and back direction. That is, the cylinder block 1 has the two cylinder rows 111R and 111L. In each of the two cylinder rows 111R and 111L, plural cylinders 11 are arranged in the crankshaft direction. The two cylinder rows 111R and 111L are arranged alongside each other. Further, the two cylinder rows 111R and 111L are arranged in the right and left direction in detail. The right cylinder row 111R and the left cylinder row 111L form a V-shaped bank. That is, in the engine 100, the two cylinder rows 111R and 111L form a V-bank. In the present embodiment, the number of right cylinders 11R included in the right cylinder row 111R and the number of left cylinders 11L included in the left cylinder row 111L are each six, as an example. That is, the engine 100 in the present embodiment is a V-type 12-cylinder engine. It is sufficient that the cylinder block 1 should have the cylinder 11 at least one in number on each of the one side and the other side in the direction intersecting the crankshaft direction. Then, it is sufficient that the V-bank should be formed by the 11 cylinders on the one side and the other side. The one side and the other side in the direction intersecting the crankshaft direction may be the right side and the left side.

In each of the right and left cylinder rows 111R and 111L, the head block 4 is placed overlapping each cylinder 11. The head block 4 is fastened to the cylinder block 1 by using a screw. In detail, the head block 4 includes a right head block 4R that overlaps the right cylinder 11R and a left head block 4L that overlaps the left cylinder 11L. Because one right head block 4R overlaps each right cylinder 11R, there are as many right head blocks 4R as there are right cylinders 11R. Because one left head block 4L is overlaps each left cylinder 11L, there are as many left head blocks 4L as there are left cylinders 11L. In the present embodiment, the number of right head blocks 4R and the number of left head blocks 4L are each six.

Each of the head blocks 4 has an intake port 41 to supply gas to a combustion chamber including the cylinder 11, the piston 7, and the head block 4, and an exhaust port (not shown) to exhaust the gas from the combustion chamber. The exhaust port is provided on the opposite face of the face where the intake port 41 is provided. In detail, the right head block 4R has the intake port 41 on the left lateral face and the exhaust port on the right lateral face. The left head block 4L has the intake port 41 on the right lateral face and the exhaust port on the left lateral face.

Each head block 4 is covered with the head cover 5. The head cover is fastened to head block 4 by using a screw. Each head cover 5 covers intake and exhaust valves (not shown) placed at the head block 4. An injector 8 is mounted on each head cover 5. The injector 8's one end portion, where an injection port for injecting a fuel is placed, faces the combustion chamber. The injector 8's another end portion projects outward from the head cover 5.

In detail, the head cover 5 includes a right head cover 5R that covers the right head block 4R and a left head cover 5L that covers the left head block 4L. The right head covers 5R, due to covering the respective right head blocks 4R, are the same in number as the right head blocks 4R. The left head covers 5L, due to covering the respective left head blocks 4L, are the same in number as the left head blocks 4L. In the present embodiment, the number of right head cover 5R and left head cover 5L are each six. Also, the number of right injectors 8R placed at the right head cover 5R and the number of left injectors 8L placed at the left head cover 5L are each six.

On the right side of cylinder block 1, the right cylinder 11R, the right head block 4R and the right head cover 5R, which are included in a right bank RB, extend diagonally upward to the right. On the left side of cylinder block 1, the left cylinder 11L, the left head block 4L, and the left head cover 5L, which are included in a left bank LB, extend diagonally upward to the left. In plan view from the front and back direction, a combination of the right bank RB and the left bank LB is V-shaped, and the engine 100 has a V-bank. An intra-bank area 200 is formed between the right bank RB and the left bank LB in the right and left direction.

Returning to FIG. 1, the engine 100 has an upper face cover 9 and a lateral face cover 10. The upper face cover 9 prevents water from splashing, due to condensation, for example, onto a controller 26 (see FIG. 4, etc., below) and the like placed inside. The lateral face cover 10 prevents the fuel from splashing due to a crack, etc. in a component part such as the head block 4, for example. Although FIG. 1 shows only the lateral face cover 10 placed on the right lateral face, a similar lateral face cover 10 is also placed on the left lateral face. That is, the engine 100 is equipped with a pair of right and left lateral face covers 10.

Figure 4:
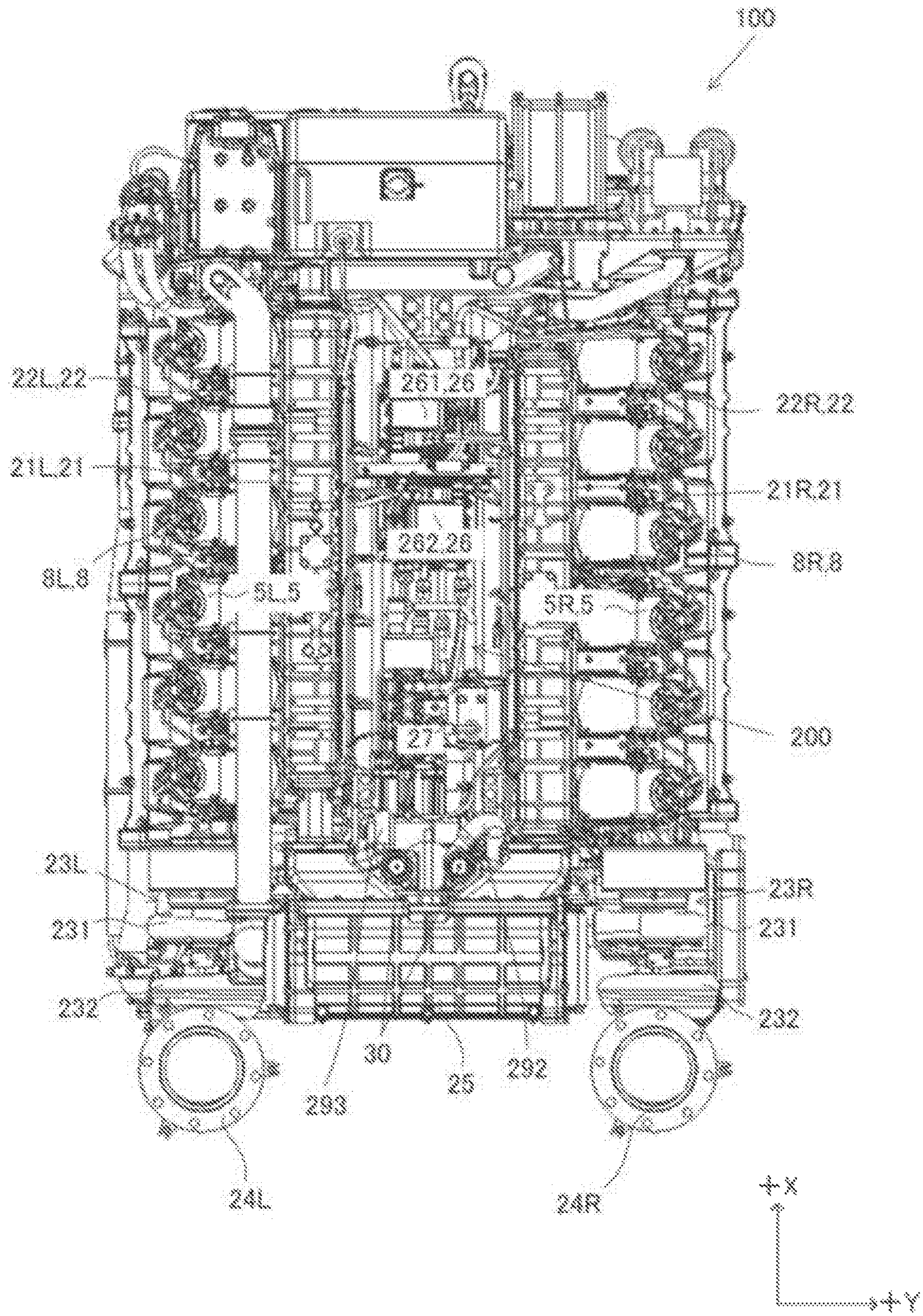
FIG. 4 is a schematic top view showing the configuration of the engine.

FIG. 4 is a schematic top view showing the configuration of the engine 100 according to the embodiment of the present invention. In FIG. 4, the upper face cover 9 and the pair of lateral face cover 10 are omitted. As shown in FIGS. 1 and 4, the engine 100 includes an intake manifold 21 and an exhaust manifold 22.

To each of the cylinders 11, the intake manifold 21 distributes intake air which is air or mixture air taken in from the outside. The intake manifold 21 is placed at an upper portion of the engine 100, and extends in the front and back direction. In detail, the intake manifold 21 includes a right intake manifold 21R for the right cylinder 11R, and a left intake manifold 21L for the left cylinder 11L. That is, the engine 100 has two intake manifolds 21R and 21L.

The right intake manifold 21R is placed above the respective intake ports 41 (see FIG. 2) of the plural right head blocks 4R which are arranged in the front and back direction. The interior of the right intake manifold 21R and the respective right cylinders 11R are connected via the respective intake ports 41. The left intake manifold 21L is placed above the respective intake ports 41 of the plural left head blocks 4L which are arranged in the front and back direction. The interior of the left intake manifold 21L and the respective left cylinders 11L are connected via the respective intake ports 41.

In detail, an intake valve (not shown) is interposed between each intake port 41 and each cylinder 11; when the intake valve is open, the inside of intake manifold 21 and cylinder 11 are communicated.

The exhaust manifold 22 collects the exhaust air from the respective cylinders 11. The exhaust manifold 22 is placed at the lateral face portion of the engine 100, and extends in the front and back direction. In detail, the exhaust manifold 22 includes a right exhaust manifold 22R for the right cylinder 11R, and a left exhaust manifold 22L for the left cylinder 11L.

The right exhaust manifold 22R is placed on the right side of the plural right head blocks 4R (see FIG. 2) which are arranged in the front and back direction. The inside of the right exhaust manifold 22R and the respective right cylinders 11R are connected via exhaust ports (not shown) provided on the right side of the right head blocks 4R. The left exhaust manifold 22L is placed on the left side of the plural left head blocks 4L (see FIG. 2) which are arranged in the front and back direction. The inside of the left exhaust manifold 22L and the respective left cylinders 11L are connected via the exhaust ports (not shown) provided on the left side of the left head blocks 4L.

In detail, an exhaust valve (not shown) is interposed between each exhaust port and each cylinder 11; when the exhaust valve is open, the inside of the exhaust manifold 22 and the cylinder 11 are communicated.

The exhaust gas collected at the right exhaust manifold 22R is exhausted to the outside via the right turbocharger 23R and the right exhaust outlet pipe 24R which are each placed at the right back of the engine 100. The exhaust gas collected at the left exhaust manifold 22L is exhausted to the outside via the left turbocharger 23L and the left exhaust outlet pipe 24L which are each placed at the left back of the engine 100.

The right turbocharger 23R and the left turbocharger 23L each have a compressor unit 231 and a turbine unit 232. The compressor unit 231 pressurizes and compresses intake air such as air supplied from outside the engine 100. The pressurized and compressed intake air is supplied via an intercooler 25 to the intake manifold 21. The turbine unit 232 is rotated by the exhaust gas supplied from the exhaust manifold 22. The rotary power of the turbine unit 232 is transmitted to the compressor unit 231. That is, the right turbocharger 23R and left turbocharger 23L in the present embodiment are so-called turbochargers that are driven by an exhaust gas turbine.

The intercooler 25, which is connected with the intake manifold 21, is supplied with cooling water by a cooling water pump (not shown), thereby to cool the intake air. The intake air supplied from the compressor unit 231 is pressurized and compressed, thereby to generate a compression heat and to be increased in temperature. The intercooler 25 performs heat exchange between the cooling water, which is supplied by the cooling water pump, and the pressurized compressed intake air, thereby to cool the intake air. That is, providing the intercooler 25 allows the temperature of the intake air, which is supplied to the intake manifold 21, to be adjusted to a desired temperature.

As shown in FIG. 4, the right intake manifold 21R and the left intake manifold 21L are spaced apart and arranged in the right and left direction at the upper portion of the engine 100. As shown in FIG. 4, with the upper face cover 9 removed, the intra-bank area 200 is exposed to the outside via a space between the right intake manifold 21R and the left intake manifold 21L. In the intra-bank area 200, there are placed, for example, the controller 26, which controls the entire engine 100, and a fuel pump 27 that supplies the fuel to the injector 8.

That is, the engine 100 includes the controller 26 placed in the intra-bank area 200 positioned between the right and left cylinder rows 111R and 111L. Also, the engine 100 includes the fuel pump 27 placed in the intra-bank area 200. The intra-bank area 200 may be, in a strict sense, a space area between the right and left cylinder rows 111R and 111L. In the present embodiment, however, the intra-bank area 200 widely includes the space area in the right and left direction between the right bank RB which includes the right cylinder row 111R, and the left bank LB which includes the left cylinder row 111L.

Creating the configuration to place the controller 26 and fuel pump 27 in the intra-bank area 200 can efficiently use the intra-bank area 200 for placing the component part. This makes it possible to downsize the engine 100. However, the controller 26 and the fuel pump 27 may be placed outside of the intra-bank area 200.

Further, the controller 26 includes, in detail, a first controller 261 and a second controller 262. However, the number of controllers 26 may be changed as needed; for example, the controller 26 may include only one controller. In the present embodiment, the first controller 261 and the second controller 262 are arranged in the front and back direction (crankshaft direction). In detail, the first controller 261 is placed forward of the second controller 262. One of the first controller 261 and the second controller 262 is a main controller and another thereof is a sub-controller. In the present embodiment, the first controller 261 is the main controller, and the second controller 262 is the sub-controller.

The first controller 261 configured as the main controller executes a calculation necessary to control the engine 100. The calculations required to control the engine 100 include, for example, a calculation related to the control of fuel injection and a calculation related to stopping the engine 100. The second controller 262 which is configured as the sub-controller is connected with the first controller 261 by a communication line (not shown), and is so provided as to be capable of communicating with the first controller 261. The second controller 262 executes a control operation according to an instruction from the first controller 261.

The first controller 261 controls the right injector 8R placed at the right bank RB. That is, the first controller 261 and each right injector 8R are electrically connected. Further, the second controller 262 controls the left injector 8L placed at the left bank LB. That is, the second controller 262 and each left injector 8L are electrically connected.

Further, the fuel pump 27 discharges the fuel, which is at a high pressure, toward a high pressure fuel pipe (not shown) for the right bank RB and a high pressure fuel pipe (not shown) for the left bank LB. The fuel passing through the high-pressure fuel pipe for the right bank RB is distributed to each of the right injectors 8R placed at the right bank RB. The fuel passing through the high-pressure fuel pipe for the left bank LB is distributed to each of the left injectors 8L placed at the left bank LB. Under control by the controller 26, each of the injectors 8 injects the fuel to the combustion chamber.

<Emission of Blow-by Gas>

The engine 100 is provided with a path (hereinafter simply described as discharge path) that discharges, from within the cylinder block 1, the blow-by gas leaked out of the combustion chamber. Further, the blow-by gases include an unburned gas, a combustion gas, and an oil vapor.

Figure 5:
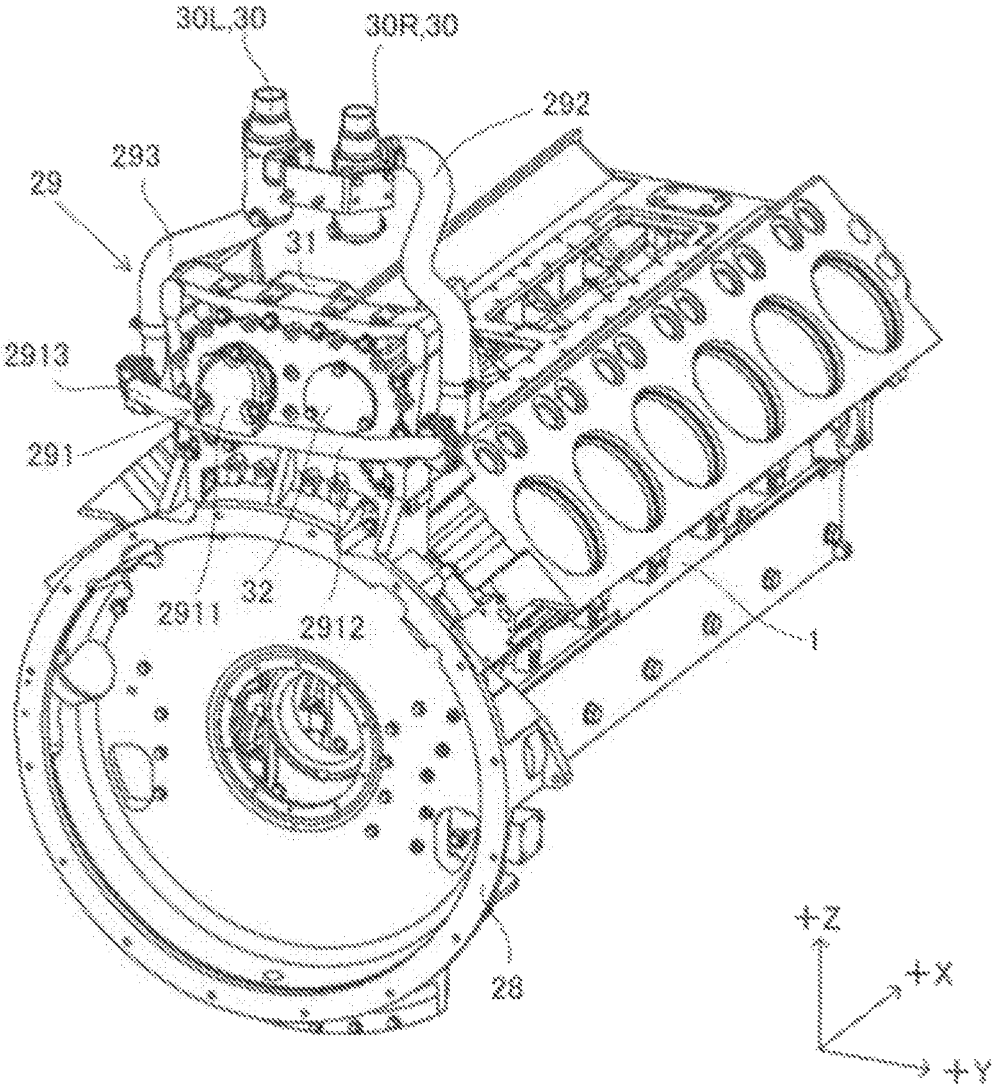
FIG. 5 is a schematic perspective view extracting and showing an element that constitutes a discharge path of a blow-by gas.

FIG. 5 is a schematic perspective view extracting and showing an element that constitutes the blow-by gas's discharge path provided in the engine 100 according to the embodiment of the present invention. As shown in FIG. 5, the elements that constitute the blow-by gas discharge path include the cylinder block 1, a flywheel housing 28, a gas pipe 29, and an oil separator 30. In other words, the engine 100 has the cylinder block 1, the flywheel housing 28, the gas pipe 29, and the oil separator 30.

Figure 6:
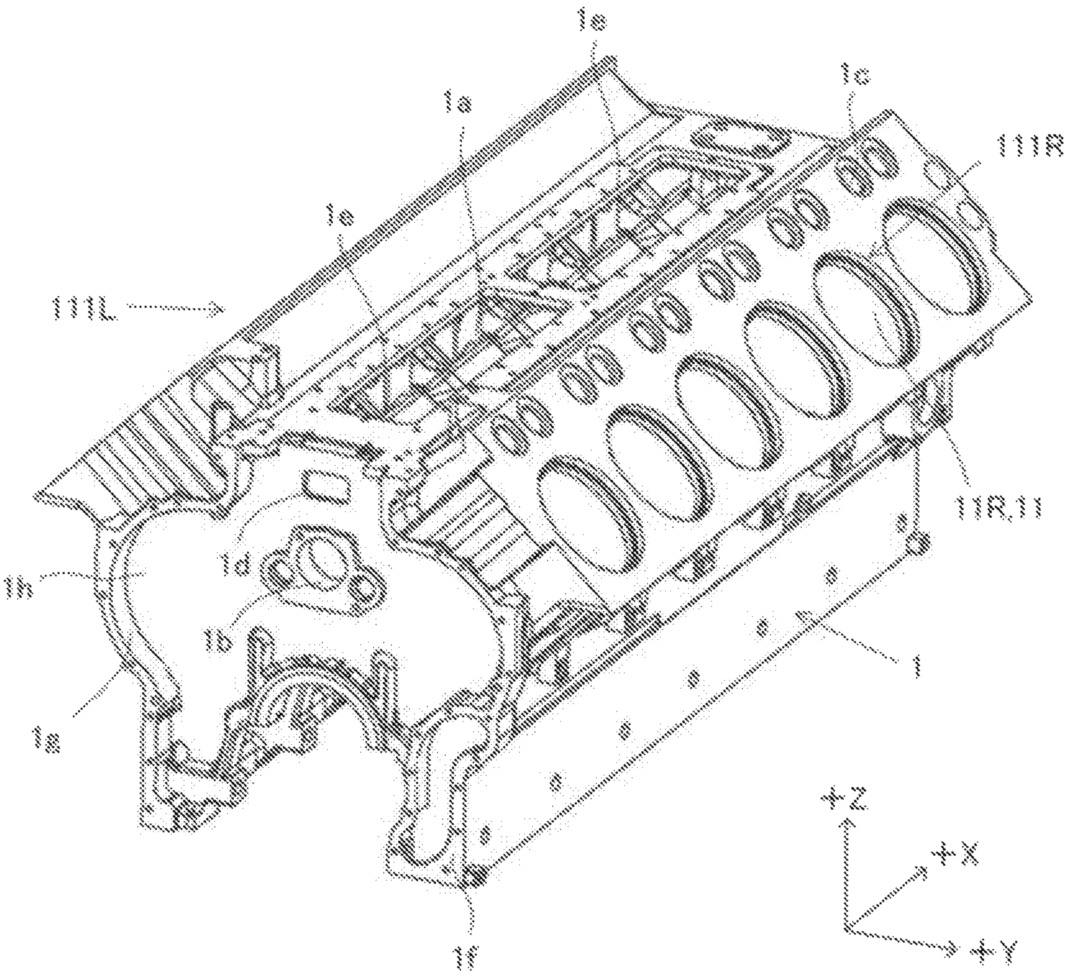
FIG. 6 is a schematic perspective view showing a configuration of the cylinder block.

FIG. 6 is a schematic perspective view showing a configuration of the cylinder block 1 provided in the engine 100 according to the embodiment of the present invention. The cylinder block 1 has two cylinder rows 111R and 111L forming the V-bank as described above, and extends in the crankshaft direction (front and back direction). The cylinder block 1 has an inner space 1*a* (hereinafter expressed as intra-block space 1*a*). Other than the above crankshaft 6, a camshaft 33 (see FIG. 9 below) and the like, for example, are placed in the intra-block space 1*a*. The front and rear faces of the cylinder block 1 are provided with camshaft holes 1*b* through which the camshaft passes. Further, the cylinder block 1 is provided with a plurality of shaft insertion holes 1*c* through which control shafts (each not shown) which, in combination with the camshaft 33, control the opening and closing operations of the intake or exhaust valve.

The blow-by gas leaking out of the combustion chamber, which is configured for each of the cylinders 11, enters the intra-block space 1*a*. The cylinder block 1, on one end face thereof in the crankshaft direction, has a discharge port 1*d* that discharges the blow-by gas.

In detail, the discharge port 1*d* is provided on the rear face of the cylinder block 1. The discharge port 1*d* is provided so as to discharge, out of the intra-block space 1*a*, the blow-by gas leaked out of the combustion chamber to the intra-block space 1*a*. In the present embodiment, the discharge port 1*d* is provided at the upper portion on the rear face of the cylinder block 1. The discharge port 1*d* is provided above the crankshaft 6 (see FIG. 9 below). The discharge port 1*d* is provided further above the camshaft hole 1*b* placed above the crankshaft 6.

In the present embodiment, as shown in FIG. 6, the cylinder block 1 has two openings 1*e* on the upper faces positioned between the two cylinder rows 111R and 111L in the right and left direction. These openings 1*e* are covered with a block upper face cover 34 (see FIG. 9 below). That is, the blow-by gas is not discharged out of the intra-block space 1*a* from these two openings 1*e*. It is allowed that the two openings 1*e* should not be provided.

The flywheel housing 28 is placed on a side of one end face of the cylinder block 1 in the crankshaft direction. The flywheel housing 28 houses the flywheel 2 (see FIG. 1). In detail, the flywheel housing 28 is placed on the rear face side of the cylinder block 1. The flywheel housing 28 is mounted on the cylinder block 1. In the present embodiment, the flywheel housing 28 is mounted directly on the cylinder block 1. That is, the rear face of the cylinder block 1 includes a housing mounting face if that is mounted to the flywheel housing 28. The front face of the flywheel housing 28 includes a block mounting face 28*a* (see FIG. 8 below) mounted to the cylinder block 1. In a state of the flywheel housing 28 being mounted to the cylinder block 1, the housing mounting face if and the block mounting face 28*a* contact each other.

The rear face of the cylinder block 1 is provided with a concave portion 1*g* concaved in a manner to face forward. The rear face of the cylinder block 1 includes the above housing mounting face if which constitutes an outer edge of the concave portion 1*g*, and a bottom face 1*h* of the concave portion 1*g*. The bottom face 1*h* of the concave portion 1*g* is placed forward of the housing mounting face 1*f*. The discharge port 1*d* is provided at the bottom face 1*h* of the concave portion 1*g*.

Figure 7:
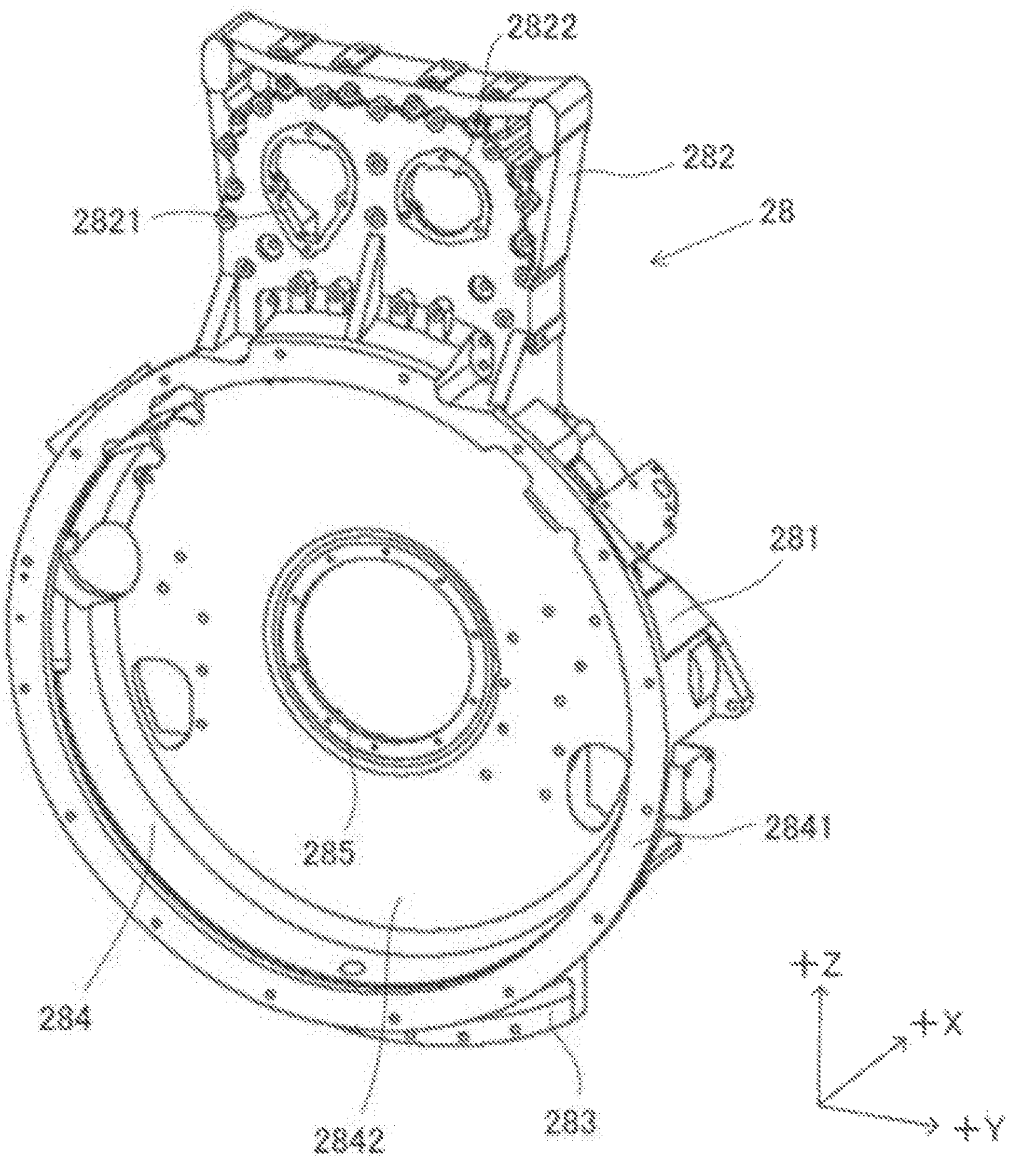
FIG. 7 is a schematic perspective view showing a configuration of a flywheel housing.
Figure 8:
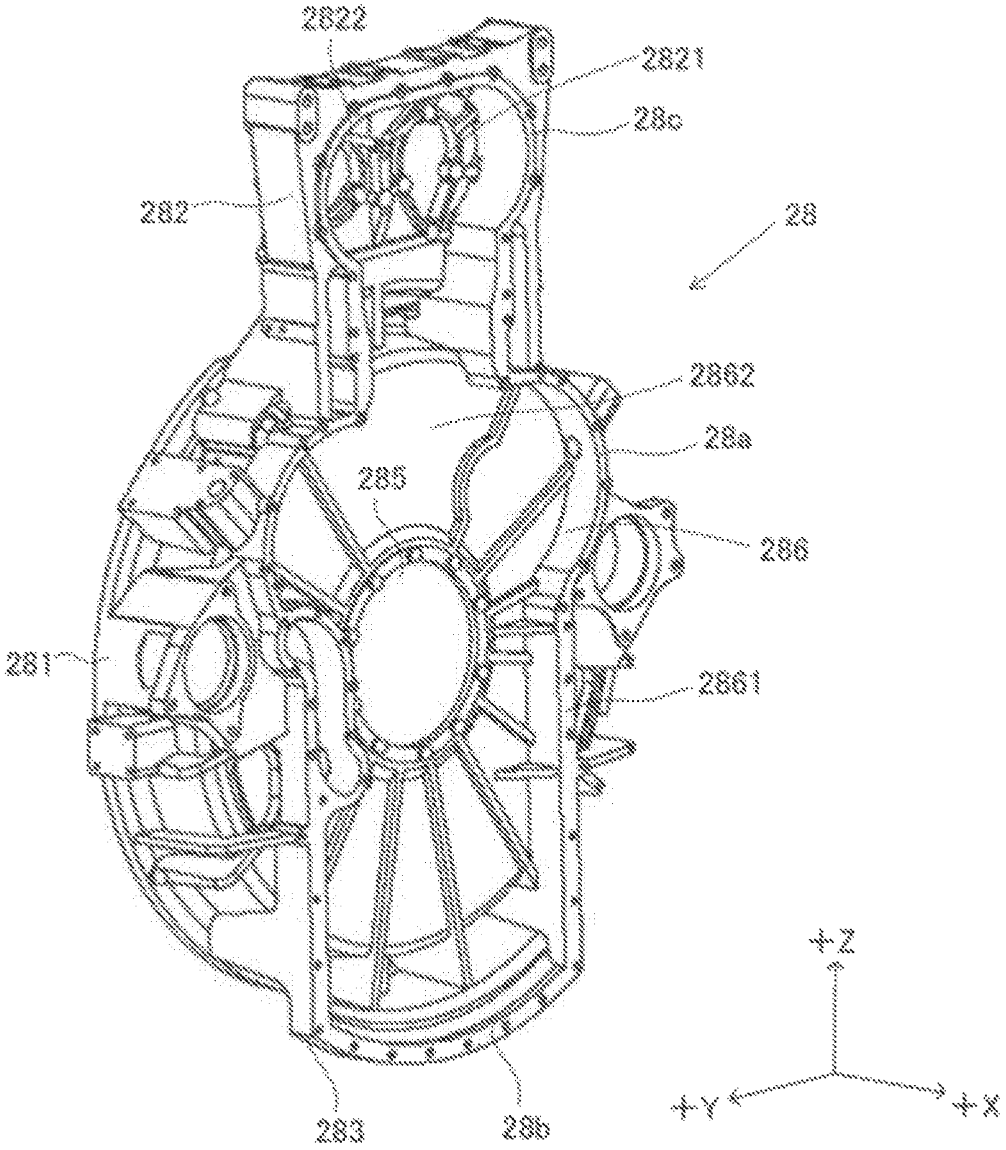
FIG. 8 is a schematic perspective view of the flywheel housing, viewed from a direction different from in FIG. 7.

FIG. 7 is a schematic perspective view showing a configuration of the flywheel housing 28 provided in the engine 100 according to the embodiment of the present invention. FIG. 8 is a schematic perspective view of the flywheel housing 28, viewed from a direction different from in FIG. 7. FIG. 7 is a diagram of the flywheel housing 28, viewed from the rear, diagonally upward to the right. FIG. 8 is a diagram of the flywheel housing 28, viewed from the front, diagonally upward to the right. As shown in FIGS. 7 and 8, the flywheel housing 28 has a housing body portion 281 that houses the flywheel 2, a housing upper piece portion 282, and a housing lower piece portion 283.

The housing body portion 281 is circular in plan view from the front and back direction. As shown in FIG. 7, the rear face of the housing body portion 281 is provided with a rear face concave portion 284 that is concaved toward the front. The rear face of the housing body portion 281 includes a ring-shaped face 2841 that constitutes an outer edge of the rear face concave portion 284 and a bottom face 2842 of the rear face concave portion 284. The bottom face 2842 of the rear face concave portion 284 is placed forward of the ring-shaped face 2841. The bottom face 2842 of the rear face concave portion 284 is provided with a crankshaft hole 285 that penetrates through the housing body portion 281 in the front and back direction. The rear end portion of the crankshaft 6 is inserted into the crankshaft hole 285, and is secured to the flywheel 2 housed in the rear face concave portion 284 (see FIG. 9, etc. below).

The housing upper piece portion 282 extends upward from the housing body portion 281. The housing lower piece portion 283 extends downward from the housing body portion 281. As shown in FIG. 8, the front face of the flywheel housing 28 is provided with a front face concave portion 286 that is concaved toward the rear. The front face concave portion 286 extends in the up and down direction. The front face concave portion 286 extends in a strip form from the housing upper piece portion 282 to the housing lower piece portion 283.

The front face of the flywheel housing 28 includes an outer edge face 2861 constituting an outer edge of the front face concave portion 286 and a bottom face 2862 of the front face concave portion 286. The bottom face 2862 of the front face concave portion 286 is placed behind the outer edge face 2861. The bottom face 2862 of the front face concave portion 286 is provided with the above crankshaft hole 285. The outer edge face 2861 includes the above block mounting face 28*a*. Further, the outer edge face 2861 includes an oil pan mounting face 28*b* mounted to the rear face of the oil pan 3 placed below the cylinder block 1. Further, the outer edge face 2861 includes a support base mounting face 28*c* that is mounted to the rear face of a fuel pump support base 31 (see FIG. 5, etc.) placed above the cylinder block 1. Further, the fuel pump support base 31 is a support stand for supporting the above fuel pump 27 placed in the intra-bank area 200.

As shown in FIGS. 7 and 8, the housing upper piece portion 282 is provided with a first upper piece portion opening 2821 and a second upper piece portion opening 2822 that penetrate through the housing upper piece portion 282 in the front and back direction. The first upper piece portion opening 2821 and the second upper piece portion opening 2822 are arranged in the right and left direction. The first upper piece portion opening 2821 is positioned to the left of the second upper piece portion opening 2822. The first upper piece portion opening 2821 and the second upper piece portion opening 2822 connect with the front face concave portion 286.

Further, the housing upper piece portion 282 may be configured with only one opening. In the present embodiment, the second upper piece portion opening 2822 is so provided that the number of revolutions can be measured by a tachometer. The second upper piece portion opening 2822, as shown in FIG. 5, is blocked by an opening portion cover 32 at the time of a normal use. If measurement of the number of revolutions is not needed, the second upper piece portion opening 2822 may be omitted.

Figure 9:
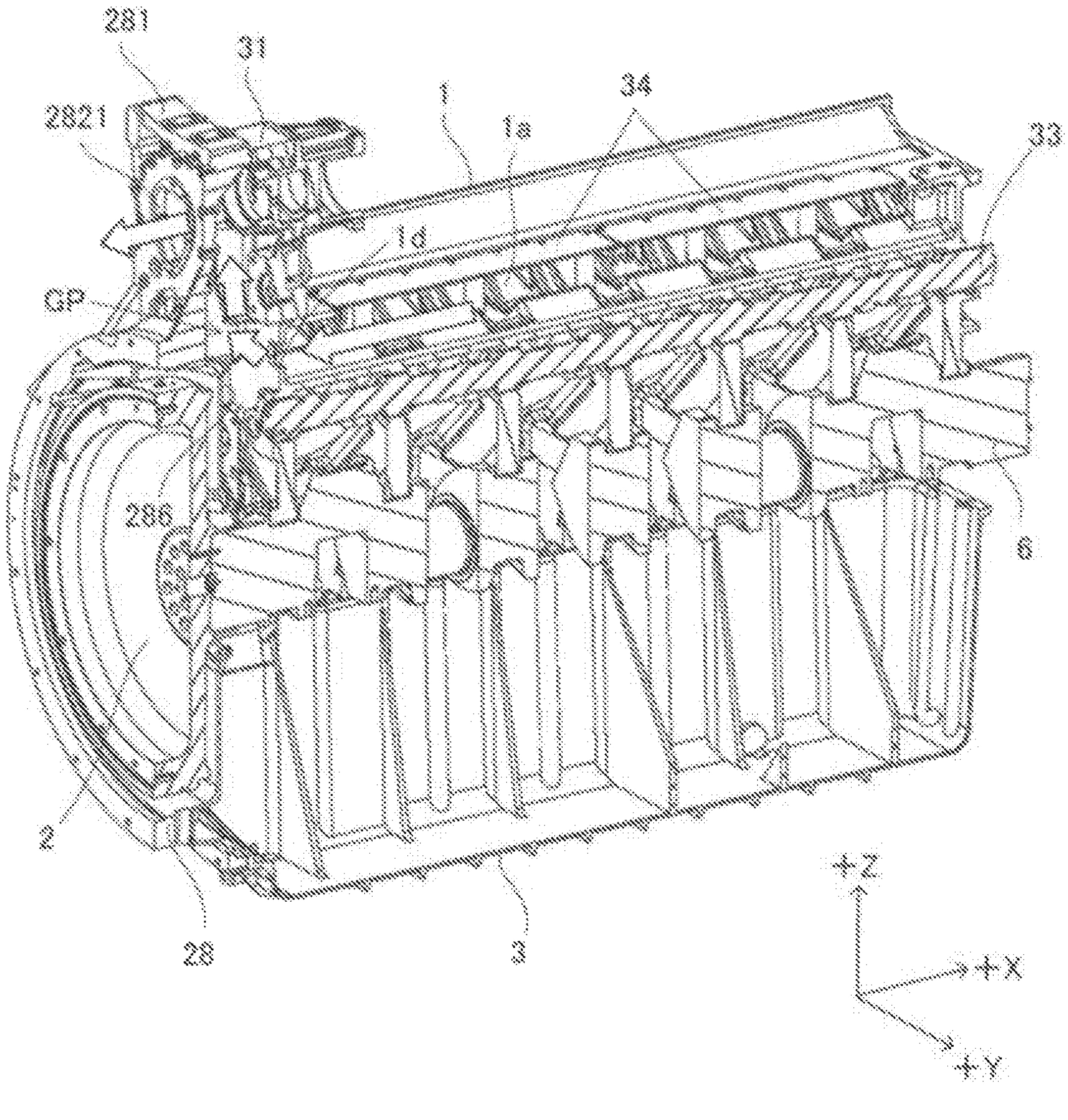
FIG. 9 is a diagram for explaining about flow of the blow-by gas.

FIG. 9 is a diagram for explaining about flow of the blow-by gas, in the engine 100 according to the embodiment of the present invention. FIG. 9 is a schematic cross-sectional perspective view extracting and showing part of components of the engine 100. In FIG. 9, the white arrow shows the flow of the blow-by gas. As shown in FIG. 9, the blow-by gas leaked out of the combustion chamber and having entered the intra-block space 1*a* is discharged via the discharge port 1*d* out of the intra-block space 1*a*.

With the flywheel housing 28 in a state of being mounted to the cylinder block 1, the discharge port 1*d* connects with the front face concave portion 286 of the flywheel housing 28. That is, the blow-by gas discharged from the discharge port 1*d* enters the front face concave portion 286. As shown in FIG. 9, the blow-by gas entering the front face concave portion 286 is discharged via the first upper piece portion opening 2821 above the discharge port 1*d* toward the rear of the flywheel housing 28.

Further, the blow-by gas having entered the front face concave portion 286 from the discharge port 1*d* passes through the space enclosed by the rear face of the fuel pump support base 31 placed in front of the flywheel housing 28, and by the face constituting the front face concave portion 286, in detail, and reaches the first upper piece portion opening 2821.

That is, the flywheel housing 28 has a blow-by gas path GP through which the blow-by gas leaking out of the combustion chamber passes. In the present embodiment, the blow-by gas path GP includes the front face concave portion 286 and the first upper piece portion opening 2821. The discharge port 1*d* communicates with the blow-by gas path GP.

Creating the configuration in which the blow-by gas path GP is provided in the flywheel housing 28 makes it possible to provide the discharge port 1*d*, which discharges the blow-by gas, on one end face of the cylinder block 1 in the crankshaft direction. This eliminates the need for an action that is required for placing the blow-by gas's discharge port on the upper face of the cylinder block 1. For example, it is unnecessary to increase the cylinder block 1's length in the crankshaft direction so as to secure a place to place the discharge port. As a result, enlarging of the engine 100 can be avoided. According to this configuration, the gas pipe that leads, to any other place, the blow-by gas discharged out of the cylinder block 1 can be placed on a side of one end face of the engine 100 in the crankshaft direction. As a result, the gas pipe for flowing the blow-by gas can be easily placed without an interference with any component included in the engine 100.

As shown in FIG. 5, the blow-by gas discharged backward from the first upper piece portion opening 2821 flows through in the gas pipe 29 and is sent to the oil separator 30. In the present embodiment, the gas pipe 29 enables the blow-by gas, which passes through the blow-by gas path GP, to be distributed to the V-bank side. In plan view from above, the gas pipe 29 extends from the position where the first upper piece portion opening 2821 is provided to between the two intake manifolds 21R and 21L in the right and left direction which are placed in the intra-bank area 200 (see also FIGS. 1 and 4).

So configuring the gas pipe 29 as to lead the blow-by gas toward the V-bank side makes it possible, by effectively using the space inside the engine 100, to form the path for discharging the blow-by gas. Further, using the spaces inside and above the V-bank can place the oil separators 30 which treat the blow-by gas.

The oil separator 30 is connected with the gas pipe 29, and separates an oil component included in the blow-by gas. The oil separator 30 collects and separates an oil mist as a vaporized lubricant component included in the blow-by gas. That is, the oil separator 30 functions as an oil mist separator. Via a chimney (not shown) to the outside, the oil separator 30 discharges the gas remaining after the oil component's being removed from the blow-by gas. To the oil pan 3, the oil separator 30, by means of an oil piping (not shown), returns the oil component separated from the blow-by gas.

It may be so configured that, instead of being discharged to the outside, the gas remaining after the oil component's being removed from the blow-by gas is sent to the intake manifold 21.

In the present embodiment; in plan view from above, the oil separator 30 is positioned between the two intake manifolds 21R and 21L in the right and left direction which are placed in the intra-bank area 200 (see FIG. 4). That is, the oil separator 30 is placed by an effective use of the space created inside the engine 100.

In detail, the oil separator 30 includes a right oil separator 30R and a left oil separator 30L which are arranged in the right and left direction. The right oil separator 30R is placed to the right of the left oil separator 30L. However, the number of oil separators 30 provided in the engine 100 may be modified as needed, and may be single or three or more.

In the present embodiment, the gas pipe 29 includes a common gas pipe 291, a right gas pipe 292, and a left gas pipe 293. The configuration of the gas pipe 29 may be changed as needed depending on the number of oil separators 30.

The common gas pipe 291 has a branch portion 2911, a right pipe portion 2912, and a left pipe portion 2913. The branch portion 2911 is positioned in the center of the common gas pipe 291, and is mounted to the rear face of the housing upper piece portion 282. The branch portion 2911 covers the first upper piece portion opening 2821. The front face of the branch portion 2911 has a concave portion (not shown) that is concaved toward the rear. The above concave portion communicates with the first upper piece portion opening 2821. The right pipe portion 2912 is a pipe-shaped extending rightward from the branch portion 2911, and has an interior communicating with the concave portion of the branch portion 2911. The left pipe portion 2913 is a pipe-shaped extending leftward from the branch portion 2911, and has an interior communicating with the concave portion of the branch portion 2911.

The right gas pipe 292 is connected at one end thereof with the right pipe portion 2912 of the common gas pipe 291 and at the other end thereof with the right oil separator 30R. The left gas pipe 293 is connected at one end thereof with the left pipe portion 2913 of the common gas pipe 291 and at the other end thereof with the left oil separator 30L. From the common gas pipe 291 placed below the intercooler 25, the right gas pipe 292 extends in a curved to the space that is in front of the intercooler 25 and that is between the two intake manifolds 21R and 21L, and is connected to the right oil separator 30R. From the common gas pipe 291 placed below the intercooler 25, the left gas pipe 293 extends in a curved manner to the space that is in front of the intercooler 25 and that is between the two intake manifolds 21R and 21L, and is connected to the left oil separator 30L.

The blow-by gas discharged backward from the first upper piece portion opening 2821 is branched to the right and left at the branch portion 2911 of the common gas pipe 291. The blow-by gas branched to the right pipe portion 2912 at the branch portion 2911 passes through the right pipe portion 2912 and the right gas pipe 292 thereby to reach the right oil separator 30R, where the oil component is removed and discharged to the outside. The blow-by gas branched to the left pipe portion 2913 at the branch portion 2911 passes through the left pipe portion 2913 and the left gas pipe 293 thereby to reach the left oil separator 30L, where the oil component is removed and discharged to the outside.

<3. Notes, Etc.>

The various technical features disclosed in the present specification can be modified in various ways without departing from the gist of the technical creation thereof. That is, the above embodiments should be considered exemplary in all respects and not restrictive. Further, the plural embodiments and modified examples shown in the present specification may be combined to the extent possible.

In the above embodiments, the engine 100 is the V-type engine, but this is merely an exemplification. The present invention can be applied, for example, to an in-line engine in which the pistons reciprocate in the up and down direction and a horizontally opposed engine in which the pistons reciprocate in the horizontal direction.

REFERENCE SIGNS LIST

1: cylinder block
1*d*: discharge port
2: flywheel
6: crankshaft
11: cylinder
11R: right cylinder
11L: left cylinder
28: flywheel housing
29: gas pipe
30: oil separator
100: engine
111L: left cylinder row
111R: right cylinder row
GP: blow-by gas path

The invention claimed is:

1. An engine comprising:
a cylinder block that has a cylinder included in a combustion chamber, wherein the cylinder block includes a discharge port and a crankshaft opening;
a crankshaft, wherein a portion of the crankshaft is positioned in the crankshaft opening of the cylinder block;
a fuel pump;
a flywheel that is mounted to one end portion of the crankshaft; and
a flywheel housing that is positioned on a side of one end face of the cylinder block in a direction of the crankshaft and that houses the flywheel,
wherein the flywheel housing defines, within an interior of the flywheel housing, a blow-by gas path through which blow-by gas passes, wherein the blow-by gas path is further defined by a member configured to support the fuel pump, wherein the flywheel housing is positioned such that a blow-by gas discharged from the discharge port is received in the blow-by gas path, and wherein the blow-by gas path is configured such that blow-by gas discharged from the flywheel housing includes a gas component and an oil component.

2. The engine as claimed in claim 1, wherein the flywheel housing is positioned such that the blow-by gas discharged from the discharge port is discharged directly into the blow-by gas path.

3. The engine as claimed in claim 1, wherein the cylinder block includes:
a first row of at least one cylinder;
a second row of at least one cylinder, the second row positioned relative to the first row such that the first and second rows form a V-bank; and
a gas pipe that enables the blow-by gas that has passed through the blow-by gas path to be distributed to the V-bank.

4. The engine as claimed in claim 3, comprising an oil separator that is connected with the gas pipe, and is configured to separate the oil component included in the blow-by gas.

5. The engine as claimed in claim 1, wherein:
the cylinder block comprises a first row of at least one cylinder and a second row of at least one cylinder, the second row is positioned relative to the first row such that the first and second rows form a V-bank defining an intrabank area between the first row and the second row, and
the flywheel housing is positioned such that the blow-by gas path is configured to receive blow-by gas from the intrabank area.

6. The engine as claimed in claim 1, wherein:
the cylinder block comprises a first row of at least one cylinder and a second row of at least one cylinder, the second row is positioned relative to the first row such that the first and second rows form a V-bank defining an intrabank area between the first row and the second row, and the discharge port is positioned such that the discharge port is configured to discharge blow-by gas from the intrabank area.

7. The engine as claimed in claim 1, wherein the discharge port is positioned between the crankshaft opening and an outlet of the blow-by gas path in an up and down direction.

8. The engine as claimed in claim 1, wherein the flywheel housing comprises a lower portion and an upper portion extending from the lower portion.

9. The engine as claimed in claim 8, wherein the upper portion includes an outlet of the blow-by gas path.

10. The engine as claimed in claim 1, further comprising an oil separator, wherein blow-by gas discharged from the flywheel housing is directed to the oil separator via one or more pipes.

11. The engine as claimed in claim 1, wherein the crankshaft is exterior to the interior of the flywheel housing.

12. A flywheel housing configured to house a flywheel provided in an engine, the flywheel housing defining, within an interior of the flywheel housing, a blow-by gas path through which blow-by gas passes, wherein the flywheel housing is configured to be coupled to a cylinder block of the engine such that, when the flywheel housing is coupled to the cylinder block, the blow-by gas path is configured to receive a blow-by gas that is discharged from a discharge port of the cylinder block, wherein the flywheel housing is configured to be coupled to a support member such that the flywheel housing and the support member define the blow-by gas path, and wherein the support member is configured to support a fuel pump, and wherein the blow-by gas path is configured such that blow-by gas discharged from the flywheel housing includes a gas component and an oil component.

13. The flywheel housing as claimed in claim 12, wherein the discharge port is positioned between a crankshaft opening of the flywheel housing and an outlet of the blow-by gas path in an up and down direction.

14. The flywheel housing as claimed in claim 12, comprising a lower portion and an upper portion extending from the lower portion.

15. The flywheel housing as claimed in claim 14, wherein the upper portion includes an outlet of the blow-by gas path.

16. The flywheel housing as claimed in claim 12, wherein the engine comprises a crankshaft, and wherein the flywheel housing is configured such that the crankshaft is exterior to the interior of the flywheel housing.

17. An engine comprising:

a cylinder block that has a cylinder included in a combustion chamber, wherein the cylinder block includes a discharge port and a crankshaft opening;

a crankshaft, wherein a portion of the crankshaft is positioned in the crankshaft opening of the cylinder block;

an oil separator;

a flywheel that is mounted to one end portion of the crankshaft; and a flywheel housing that is positioned on a side of one end face of the cylinder block in a direction of the crankshaft and that houses the flywheel, wherein the flywheel housing defines, within an interior of the flywheel housing, a blow-by gas path through which blow-by gas passes, wherein the flywheel housing is positioned such that a blow-by gas discharged from the discharge port is received in the blow-by gas path, wherein the blow-by gas path is configured such that blow-by gas discharged from the flywheel housing includes a gas component and an oil component, and wherein blow-by gas discharged from the flywheel housing is directed to the oil separator via one or more pipes.

18. The engine as claimed in claim 17, wherein the oil separator is positioned in an intra-bank area of the engine.

* * * * *